United States Patent [19]
Pregenzer et al.

[11] Patent Number: 6,083,391
[45] Date of Patent: Jul. 4, 2000

[54] DENTAL SEPARATOR

[76] Inventors: Bruno Pregenzer, Untermieming 45a, A-6414 Untermieming; Alfred Konzett, Dorfstrasse 21a, A-6082 Patsch, both of Austria

[21] Appl. No.: 09/315,330

[22] Filed: May 20, 1999

[51] Int. Cl.⁷ .................................................. B01D 21/00
[52] U.S. Cl. .......................... 210/305; 210/311; 210/521; 210/532.1
[58] Field of Search ..................... 209/273, 355, 209/17, 16, 353, 18, 208; 210/311, 511, 521, 522, 532.1, 300, 301, 305, 320, 540

[56] References Cited

U.S. PATENT DOCUMENTS

| | | | |
|---|---|---|---|
| 4,564,374 | 1/1986 | Hoffmann | 55/57 |
| 4,591,437 | 5/1986 | Ernryd et al. | 210/265 |
| 5,018,971 | 5/1991 | Trawoger et al. | 433/92 |
| 5,667,382 | 9/1997 | Holland | 433/92 |

*Primary Examiner*—Donald P. Walsh
*Assistant Examiner*—Jonathan R Miller
*Attorney, Agent, or Firm*—Herbert L. Lerner; Laurence A. Greenberg; Werner H. Stemer

[57] ABSTRACT

For separating solids from a mixture of liquid and solids arising at a dental treatment site, a housing (1) has a solids separator chamber (12) in which there are sedimentation dishes (14) which are arranged coaxially above one another and through which the mixture flows from the bottom upward. Both the mixture outlet and the liquid outlet (24) are arranged above the submerged sedimentation dish (14).

15 Claims, 4 Drawing Sheets

DENTAL SEPARATOR

BACKGROUND OF THE INVENTION

FIELD OF THE INVENTION

The invention relates to a separator for separating solids from a mixture of liquid and solids which is suctioned from a patient's mouth at a dental treatment site. The solids include drilling grit, bone splinters, mercury-containing amalgam particles, possibly also particles of dental metals, such as dental gold, etc., of which mercury in particular must not be allowed to enter the waste water for reasons of environmental protection.

For about 20 years now, at least a large proportion of the solids has therefore been separated off from the mixture, and there have in principle been three different possible ways of doing this, namely deposition of heavy particles by the effect of gravity, deposition with active assistance of centrifugal forces in centrifugal drums or the like, and retention of particles above a certain size by means of filters, sieves or the like.

Each of these three possibilities has disadvantages: Thus, retention of solids by means of filters and sieves arranged in the circulation leads to relatively rapid blockage of the pores and meshes, the deposition by gravity requires the mixture to flow through the solids separator chamber slowly and with the least possible disturbance, something which cannot be guaranteed during dental work since greatly varying quantities of liquid are flowing in, and the separation by means of centrifuges requires considerably more complex apparatus with drive motor, control system, etc.

SUMMARY OF THE INVENTION

One object of the invention is to improve the separation of solids from a dental mixture of liquid and solids by means of gravity in a compact separator, the aim being to achieve throughput rates of up to 6 to 8 l/min.

A further object of the invention is the additional separation of the suction air, transporting the mixture of liquid and solids, before the mixture enters the solids separator chamber, so that a three-phase separation is achieved.

A further object of the invention is the separation of solids from a mixture of suction air, liquid and solids, the suction air first being separated from the mixture of liquid and solids, the solids then being deposited by gravity from the liquid, and finally the suction air and the solids-free liquid being mixed together again and conveyed onward to the suction pump.

A further object of the invention is an additional separation of environmentally harmful heavy metal ions from the clarified liquid leaving the solids separator chamber.

These and further objects can be achieved with a separator according to the invention, in whose housing there is a solids separator chamber which has a mixture inlet, sedimentation dishes which are arranged coaxially above one another and through which the mixture flows from the bottom upward, and a liquid outlet located at the top. The arrangement of a plurality of sedimentation dishes above one another ensures a sufficiently large sedimentation zone in a small space, in which good sedimentation conditions are afforded even in the case of greatly varying throughput rates. Because the liquid outlet is located at the top, the solids separator chamber is flooded and the sedimentation dishes are arranged completely in the liquid.

In a further embodiment, transporting suction air is separated from the mixture in an air separator chamber which is designed in the housing above the solids separator chamber and opens into the solids separator chamber, and in which it is guided via deflection surfaces and suctioned off through an air outlet.

The liquid separator preferably comprises another preceding sedimentation zone, the mixture flowing through the preceding sedimentation zone from the top downward, then flowing down through an annular chamber outside the sedimentation zone through which the mixture flows from the bottom upward, and at the lower end being deflected inward and upward and guided through the sedimentation dishes. The annular chamber which has a narrow width contributes considerably to the stillness within the solids separator chamber, since scarcely any turbulence can be transmitted from the annular chamber into the interior of the sedimentation dishes.

In order to remove dissolved mercury compounds from the liquid also, it is further possible for at least the last sedimentation dish in the flow direction to be provided with a charge binding mercury and/or mercury ions.

The separated liquid, which is practically free of environmentally harmful substances, can be led into the waste water system, to which a liquid outlet tube leading from the housing is connected. If, upon entry into the housing, transporting suction air is separated before the solids separator chamber, as was mentioned above, then an air outflow tube leads from the air separator chamber to a downstream suction pump. If a water ring pump is used as the suction pump, then, in order to deliver the liquid required there, the liquid outflow tube can open into the air separator chamber, so that the cleared liquid is sucked back into the air stream and led off by this.

The invention is described in greater detail below with reference to the figures in the attached drawings, without being limited thereto.

DESCRIPTION OF THE PREFERRED EMBODIMENTS

Figure 1:
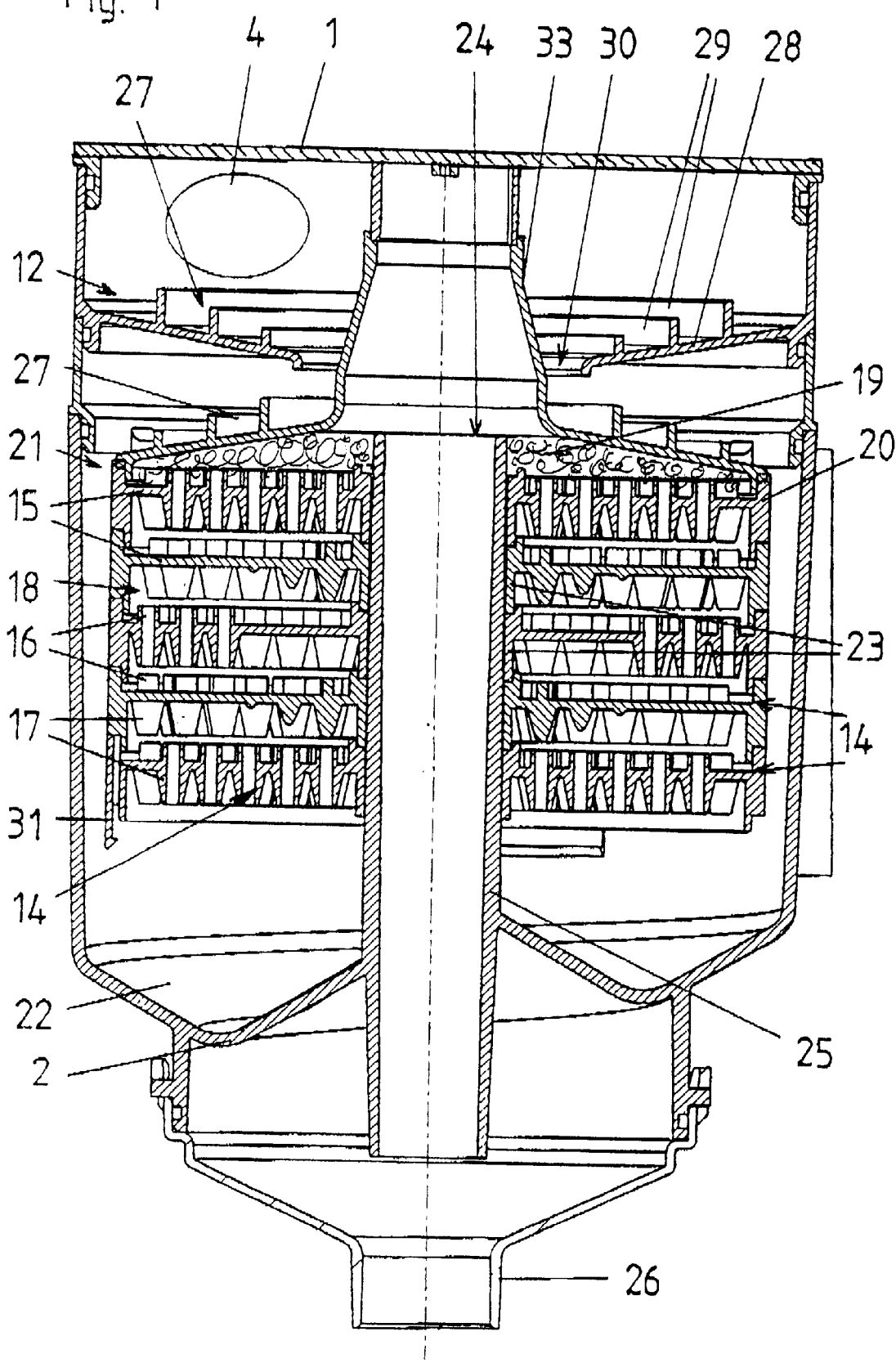
FIG. 1 shows a longitudinal section through a first embodiment of a separator.

FIG. 1 shows a separator for separating solids from a liquid, the mixture suctioned from a patient's mouth by a saliva ejector having been separated from the suction air in a preceding air separator and having been conveyed through a pressure sluice, a valve or the like, from the underpressure area of a dental suction apparatus. The separator is thus at normal air pressure and the mixture enters through the mixture inlet 4 into the housing 1, in the mixture inlet area of which there is a central annular wall 33, below which the outlet 24 for the liquid free of solids is provided on a vertical outflow tube 25, and which screens the liquid outlet 24 from the mixture inlet area.

Below the mixture inlet area, the housing 1 surrounds a solids separator chamber 12 in which the solids are separated from the liquid in two sedimentation zones. In the first of the two sedimentation zones, in which coarser and heavier particles mainly gather, the mixture flows from the top downward, and it includes two sedimentation troughs 27 which have an inclined bottom 28 and in particular three annular ridges 29, so that in each case three cascade-like, concentric deposition chambers are formed in succession.

The bottom 28 of the upper of the two sedimentation troughs 27 is inclined inward and has a central opening 30 which leaves a passage to the second sedimentation trough 27 arranged below it, and through which the annular wall 33 projects upward from the central area of the second trough 27. The second trough 27 has a bottom 28 which is inclined outward and on which there are likewise three annular ridges 29 which form further concentric, cascade-like deposition chambers in succession. Liquid and solids then flow over the outer edge of the second trough 27 down into a mixture delivery channel 21, formed by an annular chamber of narrow width, to the second, actual sedimentation zone, which is formed by a plurality of sedimentation dishes 14 arranged coaxially above one another. The mixture delivery channel 21 is delimited on the outside by the housing wall and on the inside by outer boundary walls 20 of the sedimentation dishes 14, these walls 20 together forming a tube, and during operation it is at all times filled with liquid since the liquid outlet 24 is provided at the height of the uppermost sedimentation dish 14 and the vertical outflow tube 25, whose upper end in FIG. 1 projects above the uppermost sedimentation dish 24. The mixture delivery channel 21 ends, at the housing bottom 2, in a further sedimentation chamber 22, it being possible for a closed outflow opening (not shown) to be provided at the lowermost point of the inclined housing bottom 2. At the lower end of the tube formed by the boundary walls 20 of the sedimentation dishes 14, the flow of the liquid is deflected inward and upward, with in particular, fine and very fine solid particles being entrained here, which particles then deposit in the sedimentation dishes 14 through which liquid flows from the bottom upward.

The sedimentation dishes 14 each have a bottom 15 in which there are a multiplicity of openings which are surrounded by upwardly projecting hollow cylinders 16 and by downwardly projecting hollow truncated cones 17. The upper sides of the hollow cylinders 16 define the maximum sedimentation height in each sedimentation dish 14. The outer boundary wall 20 of each sedimentation dish 14 also projects downward from the bottom 15, so that between the upper sides of the hollow cylinders 16 and the lower side of the bottom 15 of the sedimentation dish 14 arranged above there is a free space 18 remaining into which the hollow truncated cones 17 project. The sedimentation dishes 14 also have inner boundary walls which surround a central opening and through which the outflow tube 25 for the liquid runs downward, and to which a lower housing outlet 26 is assigned. The hollow cylinders 16 and the hollow truncated cones 17 are each arranged in radially extending rows, a short row being interpolated in each case between two rows which end at a greater distance to the outer boundary wall 20, said short row starting at the outside and ending about half way along the radius.

To permit the best possible deposition of very fine particles too in the sedimentation dishes 14, the openings in the bottoms 15 of the sedimentation dish 14 should not be aligned, in other words there should be no continuous flow channels, and instead the liquid emerging from the hollow cylinders 16 must be deflected laterally, in the free space 18, into at least one of the adjacent hollow truncated cones 17.

Figure 4:
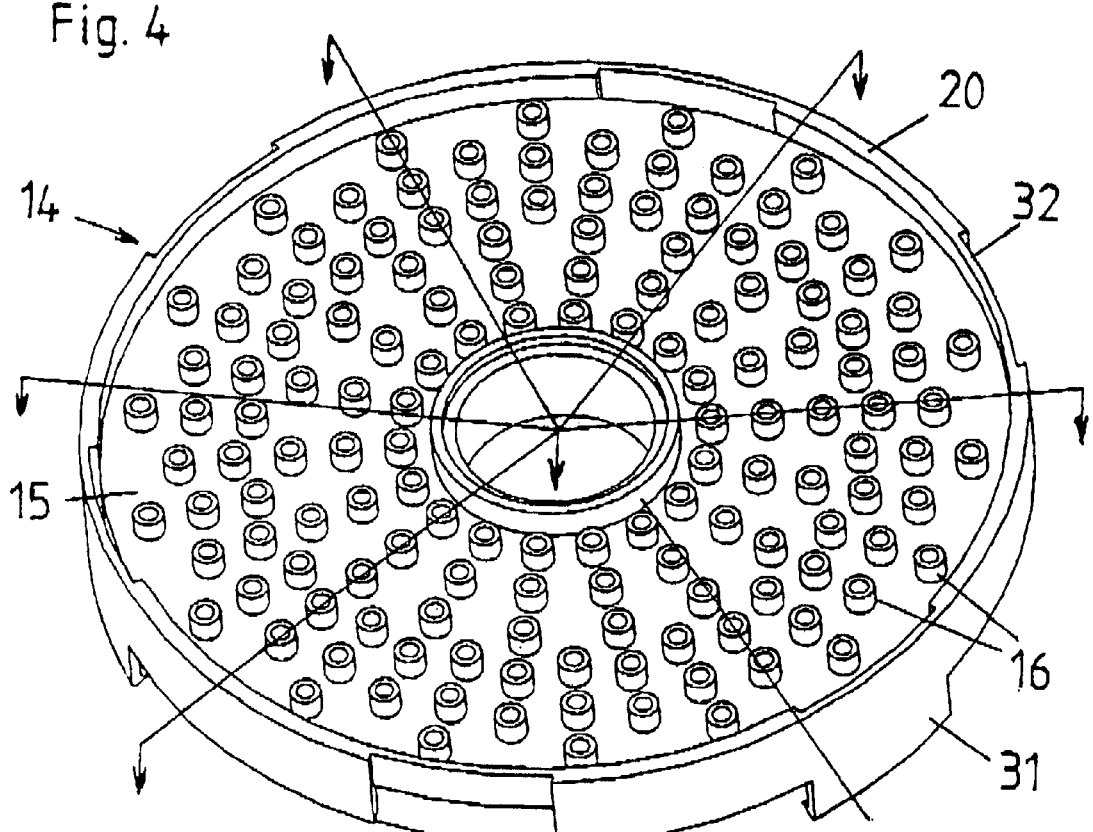
FIG. 4 shows an oblique view of a sedimentation dish from above.
Figure 5:
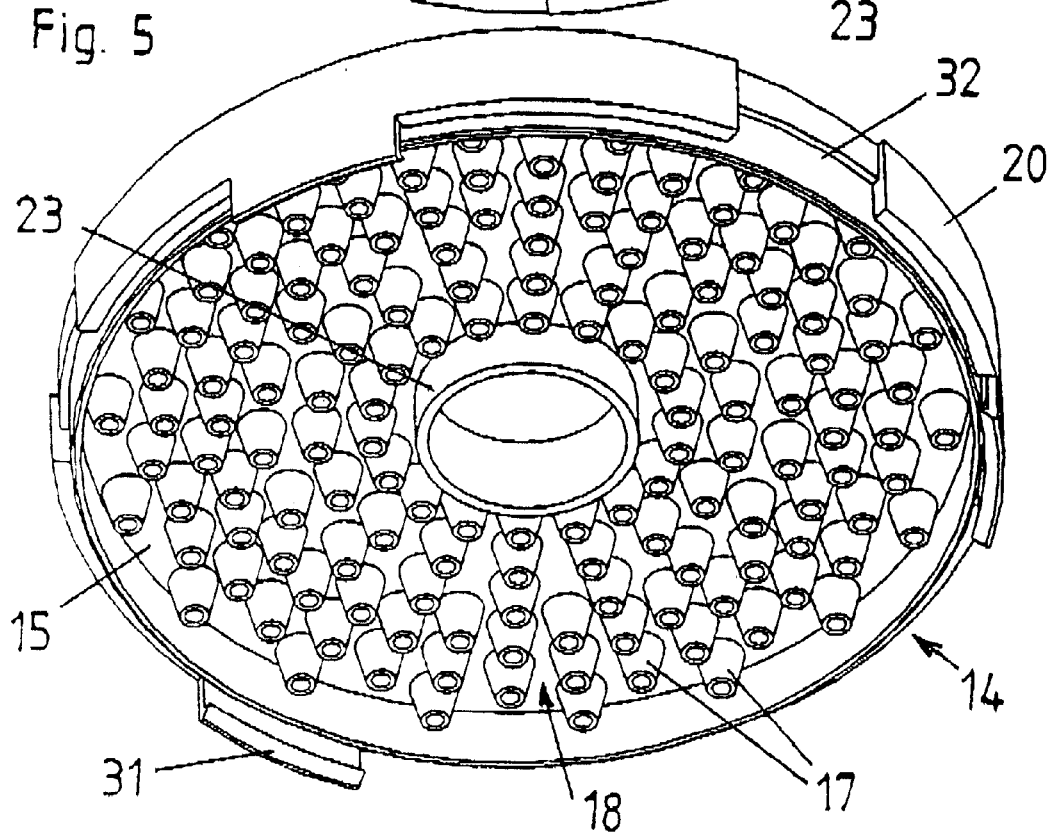
FIG. 5 shows the oblique view of a sedimentation dish from below.

As can be seen from FIGS. 4 and 5, the outer boundary walls 20 of the sedimentation dishes 14 are provided with three downwardly projecting locking ridges 31 and corresponding locking recesses 32, so that they can be stacked above one another and locked together. The recesses 32 are in this case not arranged centrally between the locking ridges 31, so that the sedimentation dishes 14, when being stacked, are not turned through 60° relative to each other, but instead, as seen in the direction of the arrow in FIG. 4, through less than 60°.

In the embodiments shown in FIGS. 4 and 5, there are 18 rows with in each case five hollow cylinders 16, which rows each enclose an angle of 20° to each other. Inserted centrally between two rows of five hollow cylinders 16 and hollow truncated cones 17 there is in each case a row with three hollow cylinders 16 and hollow truncated cones 17.

Turning the upper sedimentation dishes 14 through 20°, 40°, 60°, etc., brings the rows into convergence and the openings into alignment. Turning through 10°, 30°, 50°, etc., sets a row with five hollow cylinders/hollow truncated cones and a row with three hollow cylinders/hollow truncated cones above one another, the hollow cylinders 16 of the lower sedimentation dish 14 being offset only in the radial direction to the hollow truncated cones 17 of the sedimentation dish 14 lying above.

Figure 2:
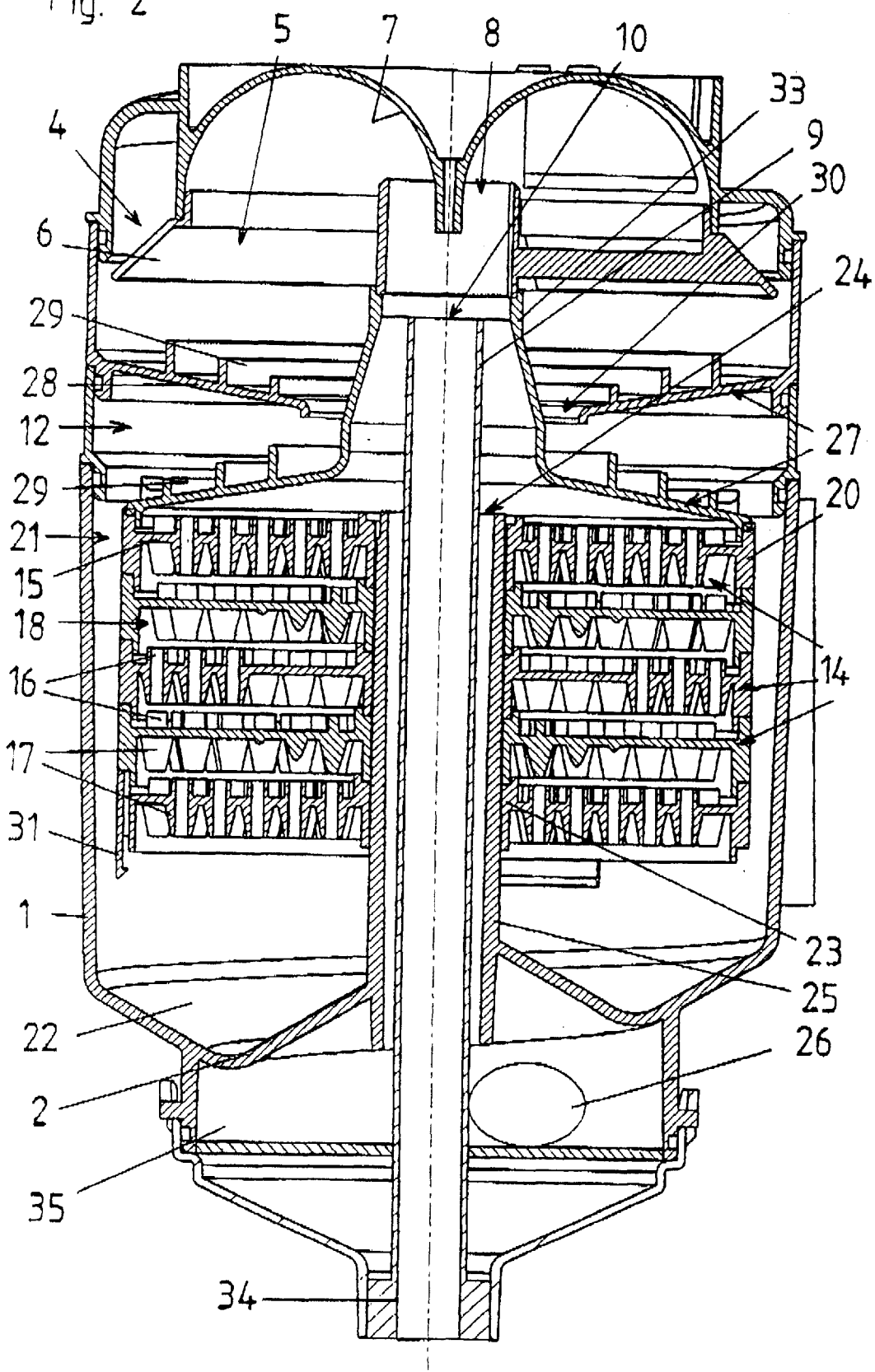
FIG. 2 shows a longitudinal section through a second embodiment of a separator.
Figure 3:
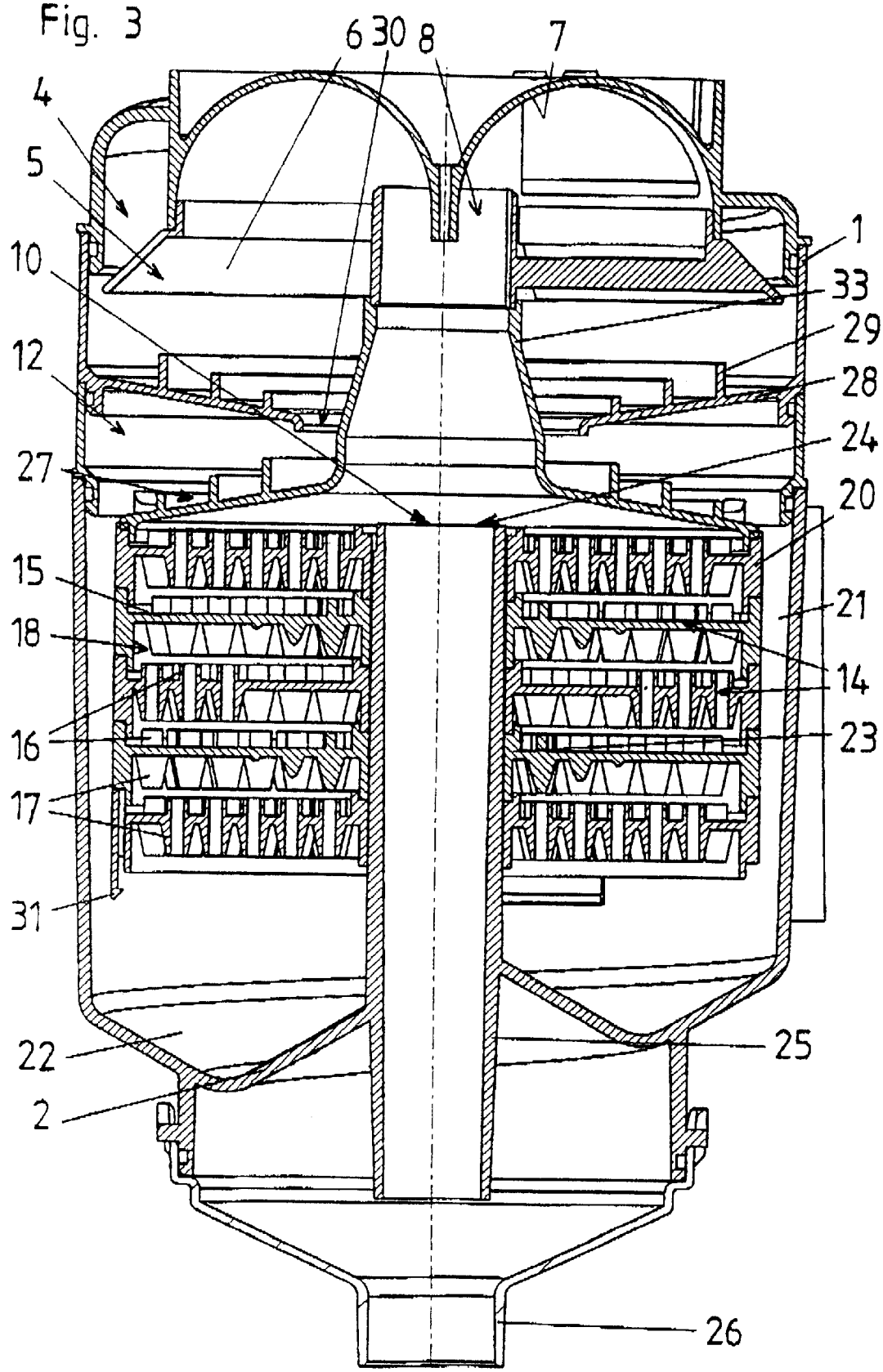
FIG. 3 shows a longitudinal section through a third embodiment of a separator.

In the longitudinal sections shown in FIGS. 1 to 3, by contrast, the arrangements of the hollow cylinders/hollow truncated cones only agree in every fourth sedimentation dish 14, as is evident from the sections through the lowermost and uppermost (fifth) sedimentation dish 14. This arrangement is obtained when the angle of 120° between the two adjacent locking ridges is divided in a ratio of 55° and 65ø, so that the agreement is obtained only after the fourth sedimentation dish 14, since only then is the angle of 4×55°=220° or 4×65°=260° an integral multiple of the angle of 20° between two rows of hollow cylinders/hollow truncated cones 16, 17, respectively. (All angle references relate here to the covered radial center plane of the locking ridges 31, locking recesses 32, hollow cylinders 16 and hollow truncated cones 17).

FIG. 4 shows, taking into consideration the turning of the sedimentation dishes 14 in each case in the direction of the arrow, the course of the section lines 1 to 4 which correspond to the assembled arrangement in FIGS. 1 to 3.

The uppermost sedimentation dish 14, in other words the last one in the flow direction before the liquid outlet 24, preferably contains a charge 19 which binds dissolved mercury ions and/or very finely dispersed elemental or vaporous mercury. This charge can comprise, for example, metal filaments, a metal fabric, a metal foam, etc., of a metal alloying mercury or of a baser metal (iron, zinc, tin, magnesium, copper, etc.). For removing mercury ions, an ion-exchanging charge can be provided, for example thiol, thiourea or like ion exchange materials. The charge 19 can also contain activated charcoal.

In the embodiment according to FIG. 2, the housing 1 additionally comprises an air separator chamber 5 above the solids separator chamber 12, so that the suction air transporting the mixture into the separator housing 1 is separated off prior to the solids separation in the same unit. The air separator chamber 5 contains apron-like and dome-like, centrally recessed deflection surfaces 6, 7, respectively, the mixture outlet 4 being provided above and outside the apron-like deflection surface 6. The suction air is conveyed to an air outlet 10 which is provided on an air outflow tube 9 standing centrally in the liquid outflow tube 25, and whose upper end lies inside the annular wall 33 of the sedimentation zone 27 which, in this embodiment, has an upper opening 8 into which the recessed area of the dome-like deflection surface 7 projects. At the lower end, the air outflow tube 9 has an attachment 34 for a line to the suction pump. The solids separator chamber 12 is designed in the same way as has been described for FIG. 1. The outflow tube 25, however, opens differently into a collection chamber 35 which is arranged under the housing 1 and which is provided with the lower housing outlet 26 for the clarified liquid.

In the embodiment according to FIG. 3, a separator is likwise described in whose housing 1, as in FIG. 2, there is an air separator chamber 5 and a solids separator chamber 12. A structural difference, however, is the design of the outlet area for air and liquid, since the upper end of the outflow tube 25 comprises the air outlet 10 and the liquid outlet 24. In this embodiment, the separated air is again combined with the clarified liquid, and connected to the housing outlet 26, assigned to the outflow tube 25, there is a line leading to a suction pump designed as a water ring pump and therefore also assisting the delivery of liquid.

We claim:

1. A dental separator for separating solids from a mixture of liquid and solids, comprising:

a housing formed with a mixture inlet for receiving a mixture of liquid and solids and with a solids separator chamber;

a plurality of sedimentation dishes disposed in said separator chamber coaxially above one another, whereby the mixture flows upwardly'through said sedimentation dishes; and said housing having a top formed with a liquid outlet communicating with said separator chamber.

2. The separator according to claim 1, wherein said sedimentation dishes are formed with non-aligned bottom openings and with upwardly projecting hollow cylinders surrounding said openings, said hollow cylinders defining a sedimentation height on said sedimentation dishes.

3. The separator according to claim 2, wherein each said sedimentation dish has an outer boundary wall defining a height of a free space above the sedimentation height.

4. The separator according to claim 3, which further comprises a hollow truncated cone surrounding each said bottom opening, each said truncated cone projecting downwardly into the free space.

5. The separator according to claim 3, wherein each said sedimentation dish is formed with a bottom and said outer boundary wall extends downward from said bottom.

6. The separator according to claim 2, which further comprises a central outflow tube for solid-freed liquid disposed in said housing, and wherein said sedimentation dishes are formed with inner boundary walls surrounding said central outflow tube, an upper end of said outflow tube forming said liquid outlet.

7. The separator according to claim 1, wherein said mixture inlet is formed in the top of said housing, and said outer boundary walls of said sedimentation dishes complement each other to form a tube subdividing said solids separator chamber, and wherein a mixture delivery channel is formed outside said tube, said mixture delivery channel defining a direction of flow from the top downward and, at a lower end thereof, turning inwardly and upwardly.

8. The separator according to claim 7, which comprises a first sedimentation zone defined in said solids separator chamber between said mixture inlet and said mixture delivery channel, said first sedimentation zone being formed with sedimentation troughs through which the mixture flows from the top downward, said sedimentation troughs having inclined bottoms and a plurality of concentric annular ridges each defining a respective sedimentation height.

9. The separator according to claim 8, wherein said sedimentation trough extends between a peripheral area in vicinity of a lateral wall of said housing and an inner area in vicinity of said central opening of said sedimentation trough, and including an outer annular ridge formed in said peripheral area and an inner annular ridge formed in said inner area.

10. The separator according to claim 8, wherein said sedimentation troughs of said first sedimentation zone are arranged alternatingly inclined above one another.

11. The separator according to claim 8, wherein said liquid outlet is formed below said first sedimentation zone.

12. The separator according to claim 1, wherein said plurality of sedimentation dishes include a last sedimentation dish in a flow direction, and wherein at least said last sedimentation dish is provided with a filler for binding products selected from the group consisting of mercury and mercury ions.

13. The separator according to claim 1, wherein said housing is formed with an air separator chamber above said solids separator chamber, said air separator chamber being provided with deflection surfaces, opening downward into said solids separator chamber, being formed with an air outlet, and communicating with sa id mixture inlet.

14. The separator according to claim 13, wherein said central outflow tube opens into said air separator chamber disposed above, and said liquid outlet also represents said air outlet.

15. The separator according to claim 13, which comprises an air outflow tube extending through said central outflow tube and opening into said air separator chamber, said air outflow tube having an upper end forming said air outlet of said air separator chamber.

* * * * *